ns

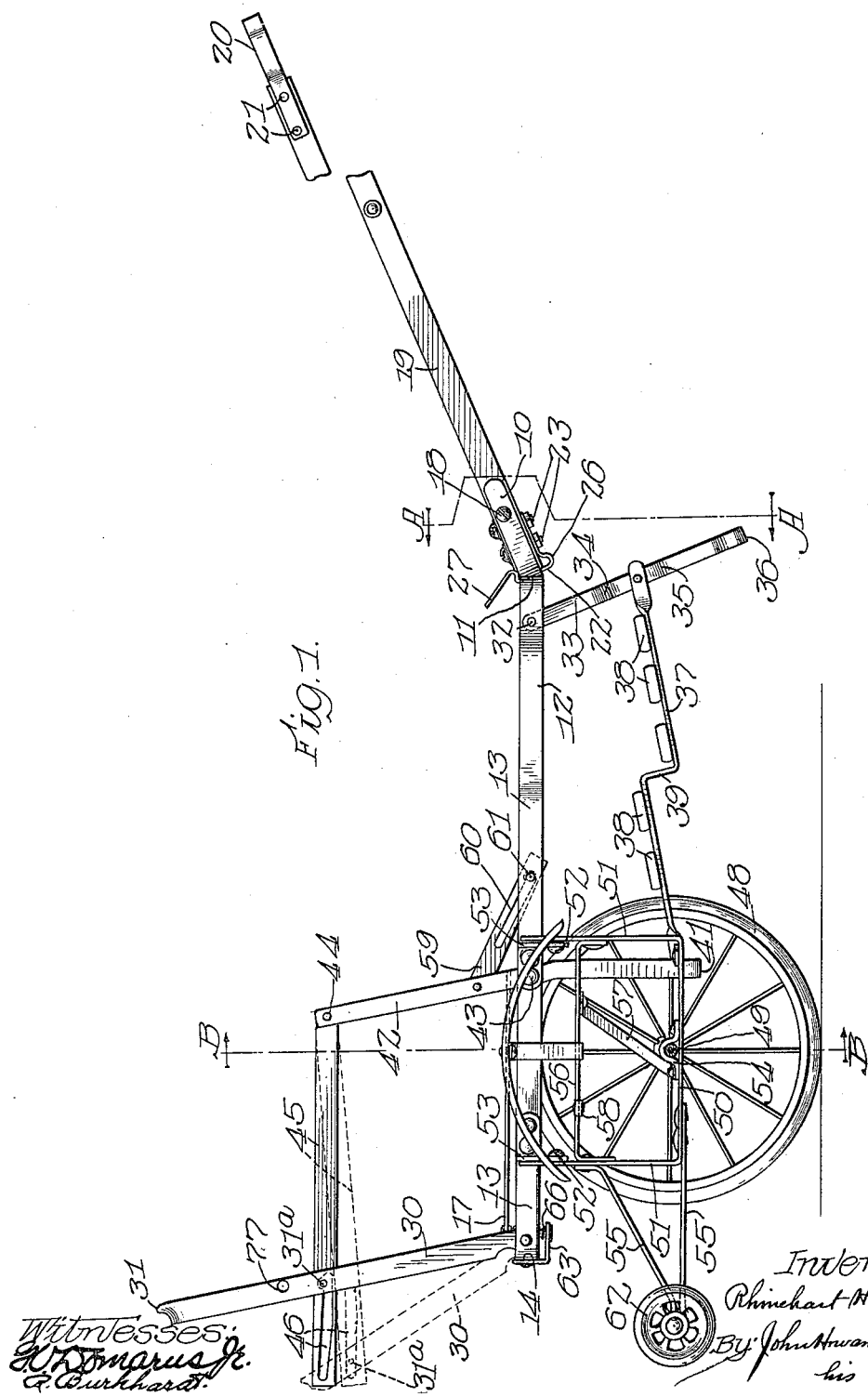

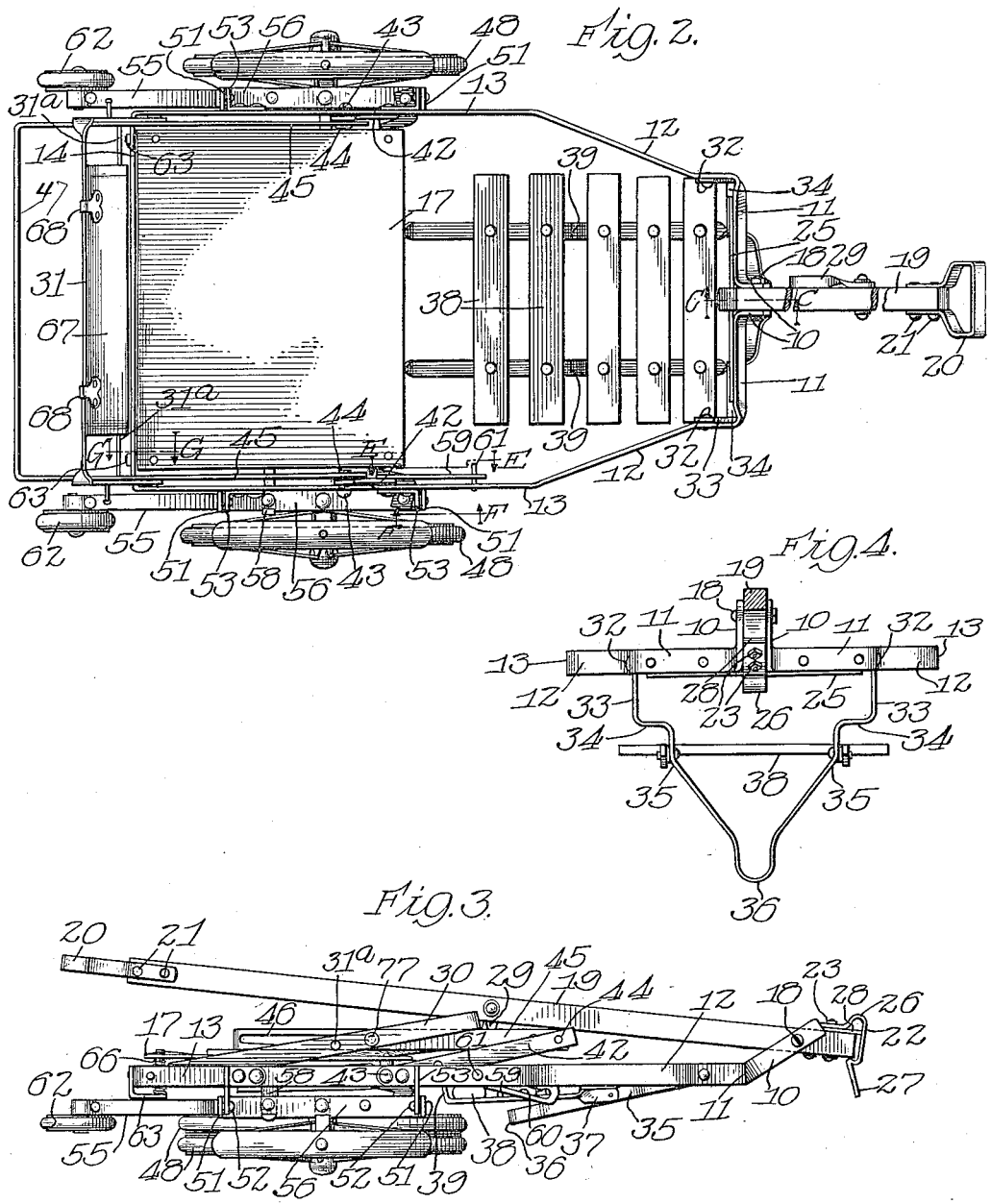

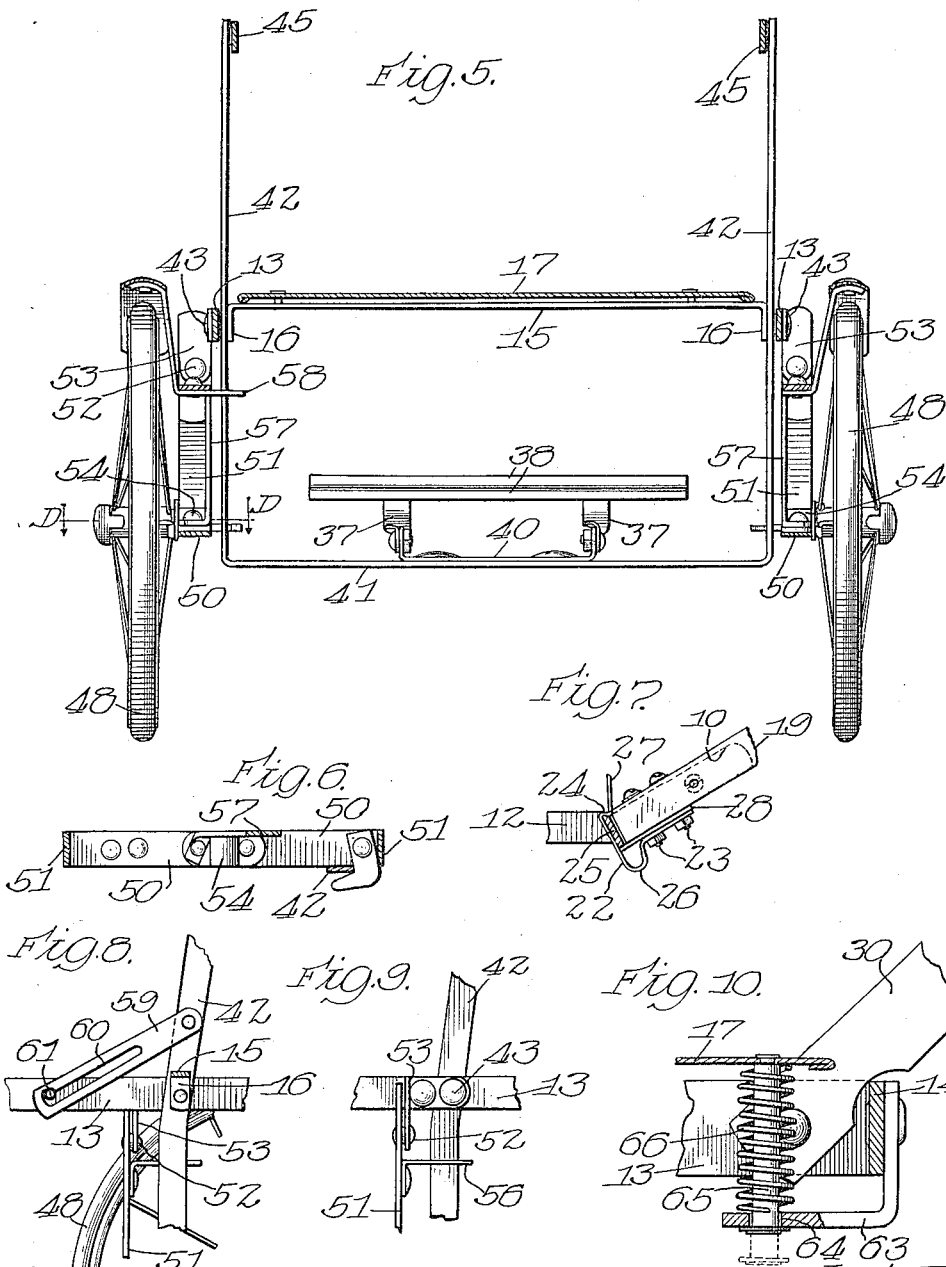

UNITED STATES PATENT OFFICE.

RHINEHART H. BROWN, OF CHICAGO, ILLINOIS, ASSIGNOR TO LA PORTE OUTING SULKY COMPANY, OF LAPORTE, INDIANA, A CORPORATION OF INDIANA.

COLLAPSIBLE SULKY.

1,148,658.      Specification of Letters Patent.      Patented Aug. 3, 1915.

Application filed November 14, 1912. Serial No. 731,260.

*To all whom it may concern:*

Be it known that I, RHINEHART H. BROWN, a citizen of the United States, and a resident of Chicago, in the county of Cook and State of Illinois, have invented certain new and useful Improvements in Collapsible Sulkies, of which the following is a full, clear, and exact specification.

My invention is concerned with collapsible sulkies of the type shown and described in my Patent No. 1,074,349, dated September 30, 1913, for Letters Patent of the United States, and embodies certain improvements in connection therewith.

My first improvement is concerned with a novel reclining-back structure, whereby the back may be held substantially vertical or in a reclining position, as the user may prefer.

My second improvement is concerned with a novel detachable pad or cushion for the back.

My third improvement is concerned with a novel locking mechanism for holding all the parts in their extended position; while my fourth improvement is concerned with a similar mechanism for holding the parts in their collapsed position; and my fifth improvement is concerned with a novel cover or top for the sulky, adapted to be collapsed therewith.

To illustrate my invention, I annex hereto four sheets of drawings, in which the same reference characters are used to designate identical parts in all the figures, of which,—

Figure 1 is a side elevation of a cart, without the top, in its operating position, and with the back substantially vertical, but with the wheel on the near side removed; Fig. 2 is a top plan view of the same; Fig. 3 is a side elevation, with the cart in its collapsed position; Fig. 4 is a view in section on the line A—A of Fig. 1; Fig. 5 is a view in section on the line B—B of Fig. 1, but on an enlarged scale; Fig. 6 is a detail in section on the line D—F of Fig. 5; Fig. 7 is a detail in section, on an enlarged scale, on the line C—C of Fig. 2; Fig. 8 is a detail in section, on an enlarged scale, on the line E—E of Fig. 2; Fig. 9 is a similar view, in section on the line F—F of Fig. 2; and Fig. 10 is a detail in section, on a still larger scale, on the line G—G of Fig. 2.

The basis of the sulky, *i. e.*, the part which is not moved in collapsing, is a horizontal seat-frame, which, as best shown in Figs. 1 to 3, inclusive, preferably consists of a metal bar having parallel ends 10 which approach closely enough to form a pivotal support for the tongue, which will be described later on. From these end portions 10 are two portions 11 which extend at right angles to the end portions 10 and which form the front end of the frame. From these portions 11 extend the diverging portions 12, which merge into the straight parallel portions 13, which are connected by the rear portion 14. The forward end of the preferably sheet-metal seat 17 is riveted to the bar 15 having the downwardly turned ends 16, each of which is connected by a rivet with the adjacent portion 13 of the seat-frame. The rear end of the seat is yieldingly supported in a manner to be subsequently described.

Between the ends 10 is pivoted, at 18, the tongue 19, which preferably consists of a wooden bar provided at its outer end with the metallic handle 20, which may be of any desired shape, and is shown as secured thereto by the rivets 21. The inner end of the tongue has secured thereto a catch member 22, which, as best seen in Fig. 7, is firmly secured to the under side of that end of the tongue by the screws 23, and which has the bent-over end forming the catch shoulder 24, which is adapted to catch over the metallic brace-bar 25 riveted to the inner sides of the portions 11 of the seat-frame. The catch member 22, being made of spring metal, can be sprung into and out of engaging position with the upper surface of the piece 25 to lock the tongue 19 in its extended position. To give the catch member 22 the necessary elasticity, I preferably form therein a bend 26, and the free outer end 27 serves as a thumb piece to be engaged in releasing the tongue. To form a rigid stop for the piece 25 to rest against, I interpose the short iron strip 28 between the other end of the catch piece 22 and the tongue, the bolts 23 serving also to secure the piece 28 in place. The tongue 19 also has pivoted thereto the catch member 29, which, when the parts are collapsed as shown in Fig. 3, is adapted to have the hooked end thereof engage one of the slats 38 of the seat-frame which is to be described. While I prefer this location of the locking member 29 when the collapsible top is to be employed with the sulky, it will be understood that it could be located elsewhere, as at the outer end of the handle, as shown in my aforesaid application No. 654,375, when the top is not employed.

The back-rest frame is likewise mainly composed of a single metal bar, the ends of which are pivoted to the portions 13 of the seat-frame adjacent the portion 14. The vertical portions 30 of this bar are connected by the horizontal portion 31, the bar being twisted where the portions 30 join the portion 31, so as to bring the portion 31 into a vertical plane, thus broadening the surface presented to the back of the child in the sulky. A substantially vertical standard frame is pivoted at its ends, at 32, to the portions 12 of the horizontal seat-frame, and it also is preferably constructed of a single metal bar, which has the vertical portions 33 connected by the short horizontal portions 34 and the generally converging portions 35, the rounded bottom portion 36 of which forms the stop to rest on the ground. Pivoted to the substantially vertical portions of the converging portions 35 of the standard frame are two foot-rest bars 37, which have secured thereon the slats 38, which are preferably of wood, and which, together with the bars 37, go to make up the foot-rest frame. The bars 37 are preferably provided with a vertical offset portion 39, and they are pivoted at their rear ends to ears or lugs formed by turning up the ends of the short bar 40, which is riveted to the horizontal bottom portion 41 of the U-shaped vertical arm-frame, which also is preferably made of a single bar of metal bent into the shape shown. The vertical arms 42 of this frame are pivoted to the portions 13 of the horizontal seat-frame at 43, and the same rivets which connect the downturned ends 16 of the bar 15 to the portions 13 of the seat-frame may be employed as pivots for these arms 42, which also have pivoted to their upper ends, as at 44, the arm portions 45 of the U-shaped frame, which is preferably made of a single bar of metal, and which, where the reclining back is to be employed, is connected by the slots 46 having offsets in their ends with the vertical portions 30 of the back-rest frame by the rod 31ª extending across the back-rest frame and riveted into the two vertical portions 30 thereof. When the rod rests in the offset of the slot 46, the back-rest frame is held substantially vertical, but when it is desired to bring it into a reclining position, the U-shaped frame formed by the arm portions 45 and the connecting portion 47 at the rear end thereof is lifted to disengage the rod 31ª from the offsets, when the back-rest frame can be swung back to the dotted-line position shown in Fig. 1.

It will be noted that the structure thus far described constitutes a pair of lazy tongs with transverse connections, so that by shoving forward on the bar 31, and rearward on the standard at 36, the lazy tongs will be folded to bring the members into the collapsed position shown in Fig. 3. In operation, it is not necessary to take hold of the standard at 36, as a pull on the back-rest frame is sufficient to collapse the parts forward to the position shown in Fig. 3 and when the tongue 19 is swung forward and the catch engaged with one of the slats 38, the tongue engages the portion 31 of the back-rest frame and springs it inward, thus producing a tension on the catch 29 in its engagement with the slat 38, thus preventing the catch from slipping out of position. When the catch is released, the tongue flies up a little, so that by grasping the tongue and the portion 31 of the back-rest frame, a single motion swings the parts into their opened position.

The wheels 48, which may be of any desired construction, but which are preferably of the customary wire-spoke and rubber-tire type, are mounted on the axle studs 49, which project outward from the lower horizontal portions 50 of the rectangular wheel-supporting frames, the vertical portions 51 of which are pivoted at 52 to the brackets 53 secured to and extending downwardly from the portions 13 of the seat-frame. The axle studs 49 are conveniently secured in place by clips 54, best seen in Fig. 1, secured on the upper surface of the portions 50 of the wheel-supporting frames. These frames are preferably provided with extensions 55 having journaled in the rear ends thereof the small wheels 62, there being one for each extension, and I preferably provide a pair of these extensions 55 and wheels 62, and secure one on the rear side of each of the wheel-frames 51. These extensions may be constructed of metal bars, as shown, and are preferably of such a shape and location as to bring the hubs of the wheels 62 in the same horizontal plane as the hubs of the main wheels 48 when the seat-frame stands horizontally. These wheels 62 serve to prevent the jar that otherwise occurs in passing over the curb, as when the main wheels pass off of the curb and the body of the sulky is held level, the wheels 62 catch on the curb as the main wheels leave it, thus preveneting the jar which would otherwise occur. The sulky can be run upon a curb by backing up to it and tilting the handle down until the standard 34 strikes the ground, in which position the auxiliary wheels 62 will be raised high enough so that they will extend over the top of the curb, after which the sulky can be lifted higher at its front end by the handle, and the main wheels 48 rolled onto the curb without any substantial jar.

The vertical portions 51 of the wheel-supporting frames are connected near their upper ends by the horizontal brace-bar 56, which has the downturned ends riveted thereto in a manner which will be readily apparent. The portions 50 and 56 in the two wheel-supporting frames are connected by bars 57, which act as brace rods, and also are engaged by the lower ends of the portions 42 of the vertical arm-frame as it moves to a vertical position from the horizontal collapsed position in extending or throwing the wheel frames into operative position. The bars 56 also have riveted on the under sides thereof projections 58, which are engaged by the other edges of the lower ends of the vertical portions 42 of the arm-frame to swing the wheel-supporting frames into their collapsed position substantially parallel to the seat. These projections 58 are set at different distances from the ends of the bars 56 so that one will be engaged before the other, thus always folding one wheel inside of the other wheel and preventing possible interference of the two wheels in collapsing.

To hold the parts in their extended or opened position, I employ the simple latch best shown in Fig. 8, where the short bar 59 will be seen to be pivoted to one of the vertical portions 42 of the arm-frame and to have the slot 60 therein with an offset at its end engaging the pin 61 projecting inward from the portion 13 of the horizontal seat-frame on that side. When the parts are swung to their opened position, the offset in the slot 60 catches over the pin 61 and locks the parts in their extended position, and when it is desired to collapse them, the lock is easily released by simply lifting the bar 59 until the offset is disengaged from the pin 61, after which, of course, the parts can be collapsed by pulling forward on the part 31 of the back-rest frame while simultaneously holding on to the handle or front end of the horizontal seat-frame.

The operation of the device as thus far described will now be readily apparent. Supposing that the parts are extended or opened, as shown in Fig. 1, the portion 31 of the back-rest frame is grasped and swung forward, and the lazy-tong connections heretofore described cause the foot-rest frame to be swung backward and upward beneath the seat, while the back-rest frame is swung down on the seat, and the standard is swung upward beneath the foot-rest frame. At the same time, the wheel frames are swung inward and upward beneath the foot-rest frame and the seat. When this collapsing movement is completed, the catch member 22 is operated to release the tongue, which is then swung down on the piece 31 of the back-rest frame, putting it under tension, and the catch 29 is engaged with the slat 38 of the foot-rest frame. The sulky is now locked in its collapsed position, and can be readily carried, hanging down at one side, by means of the handle 20, or it can be carried in the reversed direction by grasping either of the portions 11 of the seat-frame. When it is to be used, the catch 29 is released, the bar 31 grasped, and the structure swung out into its opened position and locked there automatically by a single movement.

The forward end of the seat 17 has already been described as riveted to the cross bar 15. The rear end is preferably spring supported in the manner best shown in Fig. 10, where it will be seen that I secure at each of the rear corners of the seat-frame, preferably by riveting to the part 14, the angle pieces 63, which have in their horizontal ends the aperture 64 to permit the downward movement of the rod 65 passing through said aperture and having its upper end riveted in the seat 17. A helically-coiled expanding spring 66, surrounding the rod 65 between the seat 17 and the bracket 63, serves to support the rear end of said seat yieldingly in a manner which will be readily apparent.

In connection with the back-rest frame, I may employ a cushion 67, which may be of any desired construction, and which is provided at its upper edge with spring clips 68 which are suitably shaped to coöperate with the cross piece of 31 the back-rest frame. The cushion thus supported rests against the rod 31$^a$, so that the child is furnished with a comfortable back against which it can lean or recline when the back-rest frame is thrown down to the dotted-line position of Fig. 1.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a collapsible vehicle, the combination with a horizontal-frame, of a pair of wheel-frames pivoted thereto, a back-frame pivotally connected to the horizontal-frame, a rod connecting the sides of said back-frame, a vertical frame pivoted to the horizontal-frame, a second horizontal frame pivoted to the top of the vertical frame and having slots in the side thereof through which said rod passes, and connections between said vertical frame and the wheel-frames for collapsing and extending the latter as the vertical frame is moved in one direction or the other.

2. In a collapsible vehicle, the combination with a horizontal-frame, of a pair of wheel-frames pivoted thereto, a back-frame pivotally connected to the horizontal-frame, a rod connecting the sides of said back-frame, a vertical frame pivoted to the horizontal-frame a second horizontal-frame pivoted to the top of the vertical frame and having slots in the side thereof through which said rod passes, said slots having offsets in their ends to lock the back-frame in its vertical position, and connections between said vertical frame and the wheel-frames for collapsing and extending the latter as the vertical frame is moved in one direction or the other.

3. In a collapsible sulky, the combination with a seat-frame, of a pair of wheel-frames pivoted thereto, a back-rest frame pivotally connected to the seat-frame, a vertical frame pivoted to the seat-frame in advance of the wheels, an arm-frame pivoted to the top of the vertical frame and pivotally connected with the back-rest frame, a locking bar pivoted to the vertical frame having a slot therein with an offset at one end, a pin on said seat-frame extending through the slot, and connections between said vertical frame and the wheel-frames for collapsing and extending the latter as the vertical frame is moved in one direction or the other.

4. In a collapsible sulky, the combination with a seat-frame, of a pair of wheel-frames pivoted thereto, a vertical frame pivoted to the seat-frame, a standard pivoted to the forward end of the seat-frame, a foot-rest frame pivoted to the standard and to the vertical frame, connections between the vertical frame and the wheel-frames for collapsing and extending the latter as the vertical frame is moved in one direction or the other, a tongue pivoted to the forward end of the seat-frame and adapted to be folded back on the seat-frame when the sulky is collapsed, and a catch depending from the tongue and adapted to engage the foot-rest frame and hold the parts in their collapsed position.

5. In a collapsible sulky, the combination with a seat-frame, of a pair of wheel-frames pivoted thereto, a vertical frame pivoted to the seat-frame, a standard pivoted to the forward end of the seat-frame, a foot-rest frame composed of two bars pivoted to the standard and to the vertical frame, together with the cross slats secured to the two bars, connections between said vertical frame and the wheel-frames for collapsing and extending the latter as the vertical frame is moved in one direction or the other, a tongue pivoted to the forward end of the seat-frame and adapted to be folded back on the latter when the sulky is collapsed, and a catch depending from the tongue and adapted to engage a slat on the foot-rest frame to hold the parts in their collapsed position.

In witness whereof, I have hereunto set my hand and affixed my seal, this 15th day of October, A. D. 1912.

RHINEHART H. BROWN. [L. S.]

Witnesses:
 JOHN HOWARD McELROY,
 MILDRED ELSNER.

Copies of this patent may be obtained for five cents each, by addressing the "Commissioner of Patents, Washington, D. C."